(12) United States Patent
Berkhahn et al.

(10) Patent No.: US 8,316,170 B2
(45) Date of Patent: Nov. 20, 2012

(54) METHOD AND DEVICE FOR TRANSFERRING DATA OVER NETWORK NODES OF A NETWORK

(75) Inventors: Sven-Olaf Berkhahn, Ohlendorf (DE);
Christian Wiese, Heeslingen (DE);
Martin Wagner, Hamburg (DE);
Wolfgang Fischer, Jork (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/104,178

(22) Filed: May 10, 2011

(65) Prior Publication Data

US 2011/0271022 A1    Nov. 3, 2011

Related U.S. Application Data

(63) Continuation of application No. PCT/EP2009/064899, filed on Nov. 10, 2009.

(60) Provisional application No. 61/112,984, filed on Nov. 10, 2008, provisional application No. 61/151,624, filed on Feb. 11, 2009.

(30) Foreign Application Priority Data

Nov. 10, 2008  (DE) .......................... 10 2008 043 622
Feb. 11, 2009  (DE) .......................... 10 2009 000 759

(51) Int. Cl.
*G06F 13/42*   (2006.01)
*G06F 13/362*   (2006.01)
(52) U.S. Cl. ........................ 710/106; 710/117
(58) Field of Classification Search .................. 710/106
See application file for complete search history.

(56) References Cited

U.S. PATENT DOCUMENTS

| 4,663,499 A | 5/1987 | Duval |
| 4,907,222 A | 3/1990 | Slavik |
| 7,009,996 B1 | 3/2006 | Eddy et al. |

(Continued)

FOREIGN PATENT DOCUMENTS

DE    102005053103    5/2007

(Continued)

OTHER PUBLICATIONS

German Office Action for Application No. DE 10 2008 043 622.4-31 dated Jun. 3, 2009.

(Continued)

*Primary Examiner* — Ryan Stiglic
(74) *Attorney, Agent, or Firm* — Jenkins, Wilson, Taylor & Hunt, P.A.

(57) ABSTRACT

A method for transmitting data via network nodes of a particular network has the following steps:
  coupling the network nodes to a respective number of coupled end devices via a bus having a transmission line and a receiving line in an interlinked arrangement;
  providing a first number of first frames which are defined in accordance with the particular network and each comprise safety-related data;
  providing a second number of second frames which are defined in accordance with the particular network and each comprise non-safety-related data; and
  transmitting the provided first frames and the provided second frames via the bus in a predetermined sequence, a respective time interval between two respective first frames transmitted via the transmission line and two respective first frames transmitted via the receiving line being set as a function of a determined sampling rate of the audio data by the coupled end devices, and at least one respective second frame being transmitted via the transmission line and via the receiving line within the respective time interval.

15 Claims, 4 Drawing Sheets

U.S. PATENT DOCUMENTS

| | | | |
|---|---|---|---|
| 8,180,940 B2 | 5/2012 | Korrek | |
| 2005/0065669 A1* | 3/2005 | Roux et al. | 701/3 |
| 2009/0299503 A1* | 12/2009 | Oster et al. | 700/81 |
| 2010/0131686 A1 | 5/2010 | Korrek | |

FOREIGN PATENT DOCUMENTS

| | | |
|---|---|---|
| DE | 10 2006 004 191 B4 | 12/2007 |
| DE | 102007016917 | 10/2008 |
| EP | 1396772 A1 * | 3/2004 |
| EP | 1 841 137 A2 | 10/2007 |
| WO | WO 00/72156 A2 | 11/2000 |

OTHER PUBLICATIONS

German Office Action for Application No. DE 10 2009 000 759.8-31 dated Aug. 5, 2009.

International Search Report for PCT Application No. PCT/EP2009/064899 dated Feb. 19, 2010.

German Office Action for Application No. DE 10 2008 043 622.4 dated Oct. 26, 2011.

* cited by examiner

METHOD AND DEVICE FOR TRANSFERRING DATA OVER NETWORK NODES OF A NETWORK

CROSS-REFERENCE TO RELATED APPLICATIONS

This application is a continuation of and claims priority to PCT International Application No. PCT/EP2009/064899 filed Nov. 10, 2009, which claims the benefit of and priority to U.S. Provisional Application No. 61/112,984 filed Nov. 10, 2008, German Patent Application No. 10 2008 043 622.4, filed Nov. 10, 2008, U.S. Provisional Application No. 61/151,624 filed Feb. 11, 2009, and German Patent Application No. 10 2009 000 759.8, filed Feb. 11, 2009, the entire disclosures of which are herein incorporated by reference.

FIELD OF THE INVENTION

The present invention relates to a method and device for transmitting data via network nodes of a particular network.

Although it can be applied in any sectors, the present invention is described in more detail in relation to an aircraft or a passenger aircraft.

The technical field of the invention relates to the transmission of data via network nodes of a particular network in an aircraft, in particular in an aircraft cabin of an aircraft.

In the Applicant's currently existing cabin management systems, known as cabin intercommunication data systems (CIDS), a special data bus known to the Applicant internally, known as the CIDS data bus, is used for the transmission of data, in particular of safety-related data such as the safety-related control and audio data, between a central control device and a plurality of end devices installed in the aircraft cabin.

The current CIDS data bus is based on the transmission of Ethernet frames and has a master or bus control device, which is arranged in the central control device of the aircraft, and a plurality of network nodes, known as decoder-encoder units (DEU), which can act as a client.

FIG. 1 is thus a schematic block diagram, of an embodiment of a conventional network 1 for transmitting data via network nodes 2-4. The network nodes 2-4 are coupled to a bus control device 14 via a bus 11. The bus 11 comprises a transmission line 12 and a receiving line 13. The transmission line 12 and the receiving line 13 are both looped through the network nodes 2-4. One or more end devices 5-10 are coupled to each network node 2-4. In the embodiment according to FIG. 1, non-safety-related end devices 5, 6 are coupled to the network node 2. The bus 11 or data bus is based on the physical 10 Mbit/s Ethernet layer. The channel access to the transmission line 12 and the receiving line 13 takes place via a statically a priori defined and deterministic time slot method which is controlled by the bus control device 14. The data for the end devices 5-10 coupled to the network nodes 2-4 are transmitted via frames or data frames in the time slots defined by the time slot method.

As well as the safety-related data, such as safety-related control data, a respective frame may also comprise non-safety-related audio data which can be transmitted as a broadcast to all of the network nodes 2-4 coupled to the bus 11. The time interval between two slots is fixed so as to be precisely equal to the reciprocal of the sampling rate of the audio data. The construction of the CIDS data bus and the statically a priori defined and deterministic time slot method mean that the safety-related data are transmitted to all of the coupled end devices 5-10 with high synchronicity and temporally deterministically with a minimal latency time. This is necessary so as to prevent Hall effects and echo effects when the audio data are reproduced via the numerous loudspeakers in the aircraft cabin. The data bus or bus 11 is further highly reliable, since the failure of individual network nodes 2-4 has no effect on the data transmission to the remaining network nodes, since the data lines, the transmission line 12 and the receiving line 13, are looped through the network nodes 2-4 and not passed through active driver modules. Disadvantageously, however, with the current data bus it is not possible also to transfer IP data packets via this CIDS data bus.

Further, in the aircraft cabin, the AFDX-switched (avionics full duplex) Ethernet data bus is used increasingly for transmitting the safety-related data. This data bus is specified in the standard ARINC 664 and uses the IP Protocol for the data transmission.

The AFDX network topology consists of one or more switches to which the end devices are connected. The data transmission between two end devices always takes place via at least one of these AFDX switches.

This specific network topology based on the AFDX switches disadvantageously leads to different latency times and to jitter effects during end-to-end transmission between two end devices, since the data have to be buffered at least briefly in each switch. The duration of the buffering in the respective network node depends considerably on the utilisation of the network and is thus not known a priori. The duration of the buffering is restricted by a static, a priori defined configuration of the data flows, in such a way that no data are discarded and quasi-determinism is achieved.

As stated previously, the current CIDS data bus disadvantageously does not allow the transmission of IP data packets. Further, because of the different latency times and the jitter effects when the data are transmitted to the end devices, the AFDX data bus is not adapted for synchronous transmission of the audio data to all of the loudspeakers in the cabin.

U.S. 2005/0065669 A1 discloses an aircraft control system for controlling the transmission of data via a CAN bus and an AFDX bus.

DE 10 2006 004 191 B4 discloses a deterministic communication system for exchanging audio data between a plurality of participants. In this communication system, audio data sets are transmitted by a participant via a data bus in an audio sample period, which corresponds to a time period between a first synchronisation signal and a second synchronisation signal, during a payload phase.

U.S. Pat. No. 7,009,996 B1 discloses a method and system for periodic and non-periodic transmission of data via a data bus of an aircraft.

U.S. Pat. No. 4,907,222 A further discloses a multiplex system for a vehicle.

U.S. Pat. No. 4,663,499 A further discloses a method for transmitting messages between a central station and various remote stations.

SUMMARY OF THE INVENTION

It is accordingly an object of the present invention to improve the transmission of safety-related data, such as CIDS data frames, and non-safety-related data, such as IP packets, via a common data bus in an aircraft.

Accordingly, a method having the following steps is proposed for transmitting data via network nodes of a particular network:

coupling the network nodes to a respective number of coupled end devices via a bus having a transmission line and a receiving line in an interlinked arrangement;

providing a first number of first frames which are defined in accordance with the particular network and each comprise safety-related data;

providing a second number of second frames which are defined in accordance with the particular network and each comprise non-safety-related data; and transmitting the provided first frames and the provided second frames via the bus in a predetermined sequence, a respective time interval between two respective first frames transmitted via the transmission line and two respective first frames transmitted via the receiving line being set as a function of a determined sampling rate of audio data by the coupled end devices, and at least one respective second frame being transmitted via the transmission line and via the receiving line within the respective time interval.

Further, a device for transmitting data via network nodes of a particular network is proposed, comprising:

at least two network nodes having a respective number of coupled end devices;

a bus which has a transmission line and a receiving line and which couples the network nodes in an interlinked arrangement;

a bus control device which is coupled to the bus and is set up to transmit first frames comprising safety-related data and second frames comprising non-safety-related data, defined in accordance with the particular network, via the bus in a predetermined sequence, a respective time interval between two respective first frames transmitted via the transmission line and two respective first frames transmitted via the receiving line being set as a function of a determined sampling rate of audio data by the coupled end devices, and at least one respective second frame being transmitted via the transmission line and via the receiving line within the respective time interval.

An aircraft having a device as described above for transmitting data via network nodes of a particular network is further proposed.

An advantage of the present invention is that it is possible to provide a common transmission of safety-related data, in a fixedly defined time interval with minimal latency and minimal jitter, and of non-safety-related data, such as IP data packets. In this case, the second frames comprising the non-safety-related IP data packets are transmitted in particular in the best-effort method or mode. Further, the use of a time-slot method provides the realtime capability of the transmission of the first frames comprising the safety-related data.

The transmission of the first frames comprising the safety-related data and the second frames comprising the non-safety-related data via a common hybrid data bus eliminates the need to implement a data bus in parallel with the conventional CIDS data bus for transmitting the IP packets. This makes it possible to reduce the weight, costs and overall complexity of the network of the aircraft. Further, the costs for customer-specific adaptations can be reduced, since only a single network has to be configured, rather than two networks as before.

The network is preferably formed as an Ethernet network, in particular as a 100 Mbit/s Ethernet network.

Advantageous embodiments and improvements of the invention are set out in the subclaims.

According to a preferred development, the respective time interval is formed as a time slot which is equal to the reciprocal of the sampling rate of the audio data by the coupled end devices.

As well as the safety-related data, the first frame may also comprise audio data, which are transmitted to all of the network nodes as a broadcast. In a case of this type, the respective time slot of the time slot method can be set so as to be equal to the reciprocal of the sampling rate of the audio data by the end devices.

Further, a device is proposed for transmitting data and energy via network nodes of a particular network, the device comprising:

at least two network nodes having a respective number of coupled end devices;

a bus which has a transmission line and a receiving line and which couples the network nodes in an interlinked arrangement;

a bus control device which is coupled to the bus and comprises:

a first means which is set up to control a transmission of first frames comprising safety-related data and second frames comprising non-safety-related data, defined in accordance with the particular network, via the bus in a predetermined sequence as data voltage signals, and to control a respective time interval between two respective first frames transmitted via the transmission line and two respective first frames transmitted via the receiving line as a function of a determined sampling rate of the audio data by the coupled end devices, and a transmission of at least one respective second frame via the transmission line and via the receiving line within the respective time interval, and a second means, which is set up to load the data voltage signals at least on the transmission line or on the receiving line with supply voltage signals adapted to the power supply of at least one network node.

According to a further preferred development, the respective time slot comprises a first partial time slot for transmitting exactly one first frame and a second partial time slot for transmitting at least one second frame.

The sum of the first partial time slot and the second partial time slot is smaller than the time slot and thus smaller than the time interval between two respective frames transmitted via the transmission line and two respective frames transmitted via the receiving line.

According to a further preferred development, a bus control device and the network nodes are coupled in the interlinked arrangement via the bus, the network nodes being coupled to the bus control device via the transmission line of the bus and via the receiving line of the bus, the transmission line and the receiving line in particular being looped through the respective network nodes.

According to a further preferred development, the respective first frames are transmitted via the transmission line and the receiving line of the bus in the respective first partial time slot by a static and deterministic time slot method.

According to a further preferred development, the end devices coupled via the network nodes are controlled by the static and deterministic time slot method in such a way that within the respective predetermined time slot of a cycle having a particular number of time slots, exactly one particular end device can receive a first frame via the transmission line and transmit exactly one first frame via the receiving line.

The number of time slots of a cycle preferably corresponds to the number of end devices coupled to the bus, in such a way that in each cycle exactly one first frame can be transmitted to each end device via the transmission line and the respective end device can further transmit exactly one first frame via the receiving line.

According to a further preferred development, the second frames are transmitted by a best-effort method.

Advantageously, the use of the best-effort method for transmitting the second frames maximises the overall data transmission rate of the bus.

According to a further preferred development, the network nodes coupled via the bus are controlled by the time slot method in such a way that within a respective predetermined time slot exactly one particular network node can receive exactly one first frame for a coupled end device and at least one second frame via the transmission line and send exactly one first frame of a coupled end device and at least one second frame via the receiving line.

According to a further preferred development, the first frames and the second frames are formed as Ethernet frames, the particular network preferably being formed as an Ethernet network.

According to a further preferred development, a respective first frame is formed from:
- a first field comprising an Ethernet preamble;
- a second field comprising audio data, in particular comprising audio broadcast data;
- a third field comprising an address which specifies at least the respective end device of the respective network node;
- a fourth field comprising the safety-related data; and
- a fifth field comprising an Ethernet checksum.

According to a further preferred development, the address of the third field of the first frame is formed as an address tuple, a first element of the address tuple addressing the respective network node and a second element of the address tuple addressing the respective end device of the respective network node.

According to a further preferred development, a respective second frame is formed from:
- a first field comprising an Ethernet preamble;
- a second field comprising an address which specifies at least one respective network node;
- a third field comprising an IP data packet; and
- a fourth field comprising an Ethernet checksum.

According to a further preferred development, within a cycle having a number N2 of time slots, the bus control device in each case transmits at least one first frame to the respective end device, addressed by the second element of the address tuple of the fourth field of the first frame, via the transmission line in a respective time slot of the cycle.

According to a further preferred development, the network node is authorised in the respective time slot of the cycle to transmit one or more second frames via the receiving line by the best-effort method after the transmission of the respective first frame of the end device addressed by the second element of the address tuple of the first frame received in the respective time slot.

According to a further preferred development, the bus control device transmits the respective second frames via the bus in a broadcast mode, the coupled network nodes each receiving the second frames, extracting the IP packet of the second frame, and passing the IP packet to the respective end device addressed by an IP address of the IP packet if the addressed end device is coupled to the respective network node.

According to a further preferred development, the authorisation for the respective network node to transmit the second frames via the receiving line within the respective cycle is set by setting a number of first frames to be transmitted to this respective network node.

BRIEF DESCRIPTION OF THE DRAWINGS

In the following, the invention is described in further detail on the basis of embodiments with reference to the following figures of the drawings.

In the figures.

DESCRIPTION OF EXEMPLARY EMBODIMENTS

Figure 1:
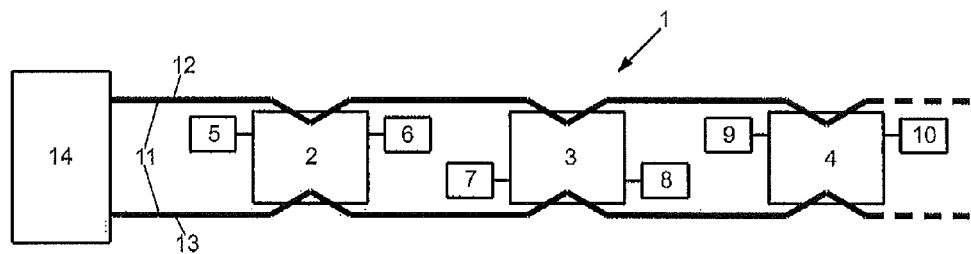
FIG. 1 is a schematic block diagram of an embodiment of a conventional device for transmitting data via network nodes of a particular network.

In the figures, like reference numerals denote like or functionally equivalent components, unless indicated otherwise.

Figure 2:
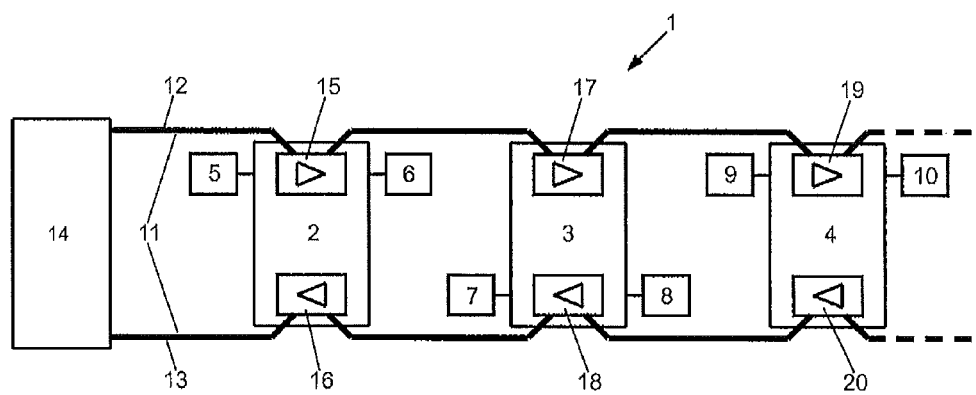
FIG. 2 is a schematic block diagram of an embodiment of a device for transmitting data via network nodes of a particular network according to the invention.

FIG. 2 shows a schematic block diagram of an embodiment of a device according to the invention for transmitting data R1, R2 via network nodes 2-4 of a particular network 1.

The network nodes 2-4 are coupled to a respective number of end devices 5-10. Without loss of generality, in the embodiment of FIG. 2 the respective network nodes 2-4 are each coupled to two end devices 5-10. For example, the network node 2 is coupled to the end devices 5 and 6. The bus 11 for coupling the network nodes 2-4 to a bus control device 14 has a transmission line 12 and a receiving line 13. The bus 11 couples the network nodes 2-4 in an interlinked (daisy-chain) arrangement. The transmission line 12 and the receiving line 13 are preferably looped through the network nodes 2-4. To amplify the signals on the transmission line 12 and the receiving line 13, each network node 2-4 preferably has an amplification means 15-20.

The bus control device 14 is in particular integrated into the central control device of the aircraft. The bus control device is further set up to transmit first frames R1, for example CIDS frames, defined according to the particular network 1, for example the Ethernet network, and comprising safety-related data D1, and second frames R2 comprising non-safety-related data D2, for example IP data packets or TCP/IP data packets, via the bus 11 in a predetermined sequence. The predetermined sequence of the first frames R1 and the second frames R2 may for example be an alternating sequence.

The respective time interval ZS1-ZS3 between two respective frames R1 transmitted via the transmission line 12 and two respective frames R1 transmitted via the receiving line 13 is set as a function of a determined sampling rate of the audio data by the coupled end devices 5-10. Within the respective time interval ZS1-ZS3, in addition to a respective first frame R1, at least one respective second frame R2 is transmitted via the transmission line 12 and via the receiving line 13.

The network nodes 2-4 are preferably also set up for a transmission of this type.

Figure 3:
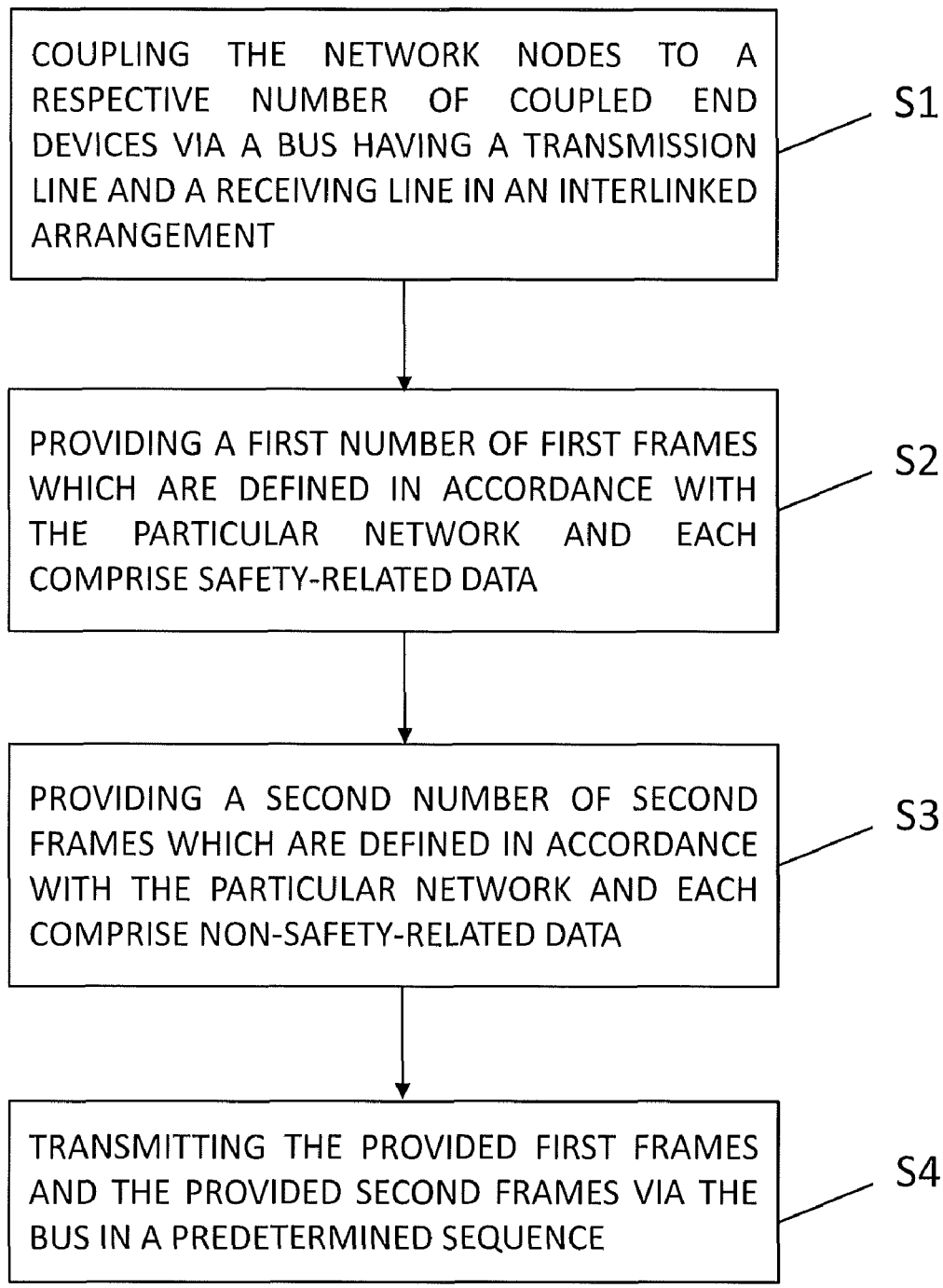
FIG. 3 is a schematic flow chart of an embodiment of a method for transmitting data via network nodes of a particular network according to the invention.

FIG. 3 is a schematic flow chart of an embodiment of a method for transmitting data R1-R2 via network nodes 2-4 of a particular network 1, for example the Ethernet network.

In the following, the method according to the invention is described on the basis of the block diagram in FIG. 3 with reference to FIGS. 2 and 4 to 7.

Figure 4:
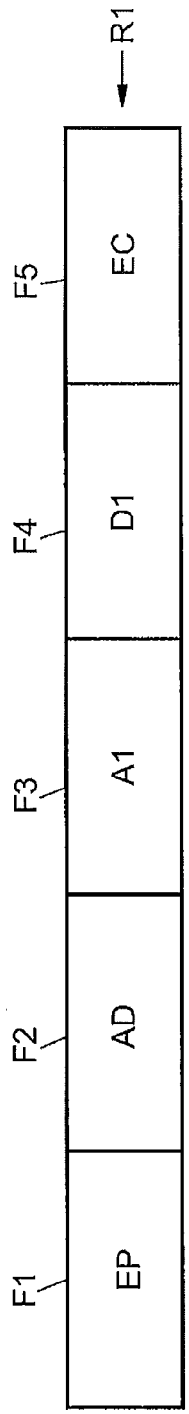
FIG. 4 is a schematic block diagram of an embodiment of a first frame according to the invention.
Figure 5:
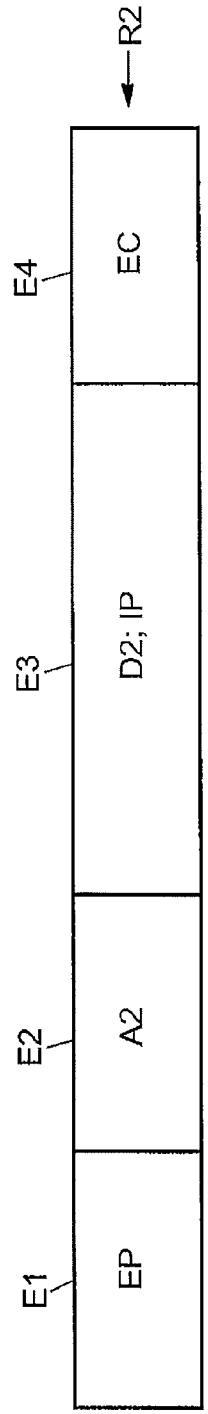
FIG. 5 is a schematic block diagram of an embodiment of a second frame according to the invention.
Figure 6:
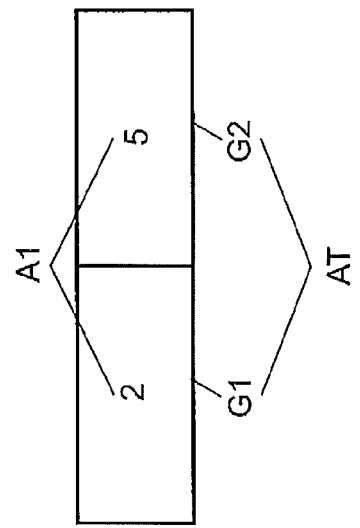
FIG. 6 is a schematic block diagram of an embodiment of an address tuple of the first frame according to FIG. 4.

FIGS. 4 and 5 are schematic block diagrams of embodiments of a first frame R1 and a second frame R2 respectively according to the invention. Further, FIG. 6 is a schematic block diagram of an embodiment of an address tuple AT of the first frame R1 according to FIG. 4.

Figure 7:
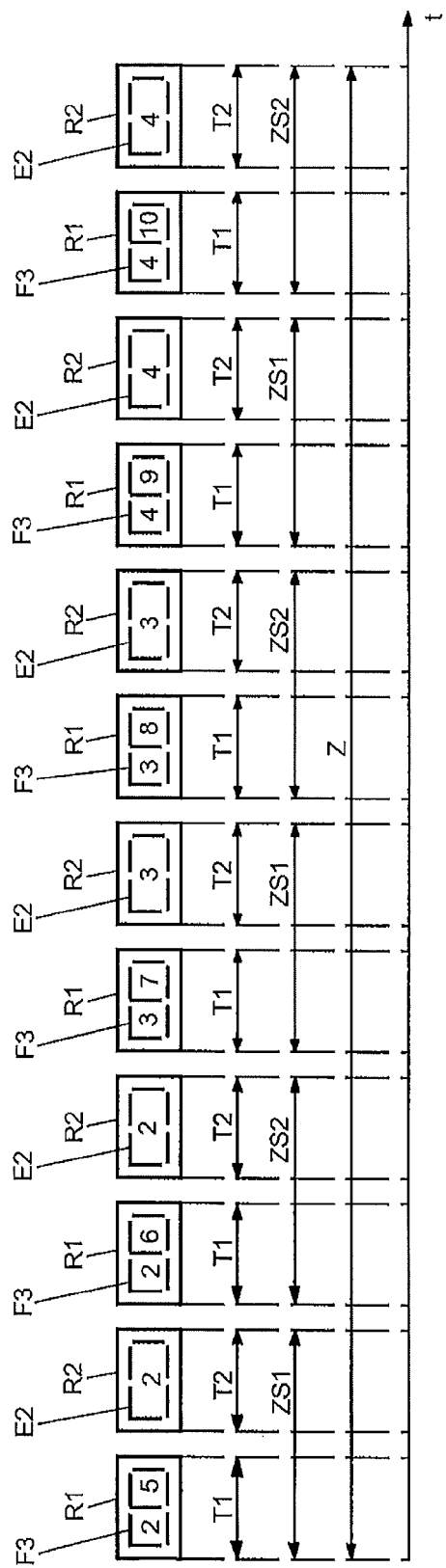
FIG. 7 is a schematic block diagram of an embodiment of a progression over time of the transmission of the first and second frames via the bus according to the invention.

Further, FIG. 7 is a schematic block diagram of an embodiment of a progression over time of the transmission of the first frames R1 and second frames R2 via the bus 11 according to the invention.

The embodiment according to FIG. 7 is based on the embodiment according to FIG. 2 having the three network nodes 2-4. The exemplary addresses of the address fields F3 of the first frames R1 and the address fields E2 of the second frames R2 are based on the reference numerals 2-4 of the individual network nodes according to FIG. 2 and the reference numerals 5-10 of the individual coupled end devices 5-10 according to FIG. 2. For example, the first frame R1 of the first time slot ZS1 is determined for the end device 5 coupled to the network node 2.

Details of this are disclosed in reference to the method according to the invention according to FIG. 3, which comprises the following method steps S1-S4:

Method Step S1:

Referring to FIG. 2, the network nodes 2-4 are coupled to a respective number of coupled end devices 5-10 via a bus 11 (data bus) in an interlinked arrangement. The bus 11 has a transmission line 12 and a receiving line 13.

Method Step S2:

A first number of first frames R1, defined according to the particular network 1 and each comprising safety-related data D1, such as safety-related control data, are provided. The first frames R1 are for example formed as CIDS frames.

Referring to FIG. 4, the respective first frame R1 can be formed by the following fields F1-F5:

a first field F1 comprising an Ethernet preamble EP;
a second field F2 comprising audio data AD, in particular comprising audio broadcasting data;
a third field F3 comprising an address A1 which specifies at least the respective end device 5-10 of the respective network node 2-4;
a fourth field F4 comprising the safety-related data D1; and
a fifth field F5 comprising an Ethernet checksum EC, such as an Ethernet CRC.

Referring to FIG. 6, the address A1 of the third field F3 of the first frame R1 is formed as an address tuple AT, a first element G1 of the address tuple AT addressing the respective network node 2-4 and a second element G2 of the address tuple AT addressing the respective end device 5-10 of the respective network node 2. As stated previously, this type of exemplary addressing is also used in FIG. 7, and so the field F3 of the first frame RI in the time slot ZS1 addresses the end device 5, which is coupled to the network node 2.

Method Step S3:

A second number of second frames R2, defined according to the particular network 1 and each containing non-safety-related data D2, such as IP packets IP, are provided.

Referring to FIG. 5, each second frame R2 is preferably formed by the following fields E1-E4:

a first field E1 comprising an Ethernet preamble EP;
a second field E2 comprising an address A2, which specifies at least one respective network node 2-4;
a third field E3 comprising an IP data packet IP; and
a fourth field E4 comprising an Ethernet checksum EC, for example an Ethernet CRC.

Method Step S4:

The provided first frames R1 and the provided second frames R2 are transmitted via the bus 11 in a predetermined sequence, a respective time interval ZS1-ZS3 between two respective first frames R1 transmitted via the transmission line 12 and two respective first frames R1 transmitted via the receiving line 13 being set as a function of a determined sampling rate of the audio data by the coupled end devices 5-10, and at least one respective second frame R2 being transmitted via the transmission line 12 and via the receiving line 13 within the respective time interval ZS1-ZS3.

Preferably, each time interval ZS1-ZS3 is formed as a time slot ZS1-ZS3 corresponding to the reciprocal of the sampling rate of the audio data by the coupled end device 5-10.

Further, each time slot ZS1-ZS3 has a first partial time slot T1 (cf. FIG. 7) for transmitting exactly one first frame R1 and a second partial time slot T2 (cf. FIG. 7) for transmitting at least one second frame R2.

The respective first frames R1 are preferably transmitted via the transmission line 12 and the receiving line 13 of the bus 11 in the respective first partial time slot T1 by a static and deterministic time slot method. By contrast, the respective second frames R2 are preferably transmitted in the respective second partial time slot T2 by a best-effort method.

Referring to FIG. 7, exactly one particular end device 5-10 can receive one first frame R1 via the transmission line 12 and transmit precisely one first frame R1 via the receiving line 13 within the respective predetermined time slot ZS1-ZS3 of the cycle Z comprising a particular number of time slots ZS1-ZS3.

Within a cycle Z having a number N2 of time slots ZS1-ZS3, the bus control device 14 preferably in each case transmits at least one first frame R1 to the respective end device 5-10, addressed by the second element G2 of the address tuple AT of the fourth field F4 of the first frame R1, via the transmission line 12 in a respective time slot ZS1-ZS3 of the cycle Z.

The network node 2-4 is in particular authorised in the respective time slot ZS1-ZS3 of the cycle Z to transmit one or more second frames R2 via the receiving line 12 by the best-effort method after the transmission of the respective first frame R1 of the end device 5-10 addressed by the second element G2 of the address tuple AT of the first frame R1 received in the respective time slot ZS1-ZS3.

Further, the bus control device 14 transmits the respective second frames R2 via the bus 11 in a broadcast mode, the coupled network nodes 2-4 each receiving the second frames R2, extracting the IP packet IP of the second frame R2, and passing the IP packet IP to the respective end device 5-10 addressed by an IP address of the IP packet IP if the addressed end device 5-10 is coupled to the respective network node 2-4.

The authorisation for the respective network node 2-4 to transmit the second frame R2 via the receiving line 13 within the respective cycle Z is preferably set by setting a number of first frames R1 to be transmitted to this respective network node 2-4.

Although the present invention has presently been described on the basis of preferred embodiments, it is not restricted thereto, but can be modified in many different ways.

LIST OF REFERENCE NUMERALS

1 network
2-4 network node
5-10 end device
11 bus
12 transmission line
13 receiving line
14 bus control device
15-20 amplification means A1 address
A2 address
AD audio data
AT address tuple
D1 safety-related data
D2 non-safety-related data
E1 first field of the second frame
E2 second field of the second frame
E3 third field of the second frame
E4 fourth field of the second frame.
EP Ethernet preamble
EC Ethernet checksum
F1 first field of the first frame
F2 second field of the first frame
F3 third field of the first frame
F4 fourth field of the first frame
F5 fifth field of the first frame
G1 first element of the address tuple
G2 second element of the address tuple
IP IP packet
S1-S4 method step
T1 first partial time slot
T2 second partial time slot
Z cycle
ZS1-ZS3 time slot

The invention claimed is:

1. Method for transmitting data via network nodes of a particular network, comprising the steps of:
   a) coupling the network nodes to a respective number of coupled end devices via a bus having a transmission line and a receiving line in an interlinked arrangement;
   b) providing a first number of first frames which are defined in accordance with the particular network and each comprise at least safety-related data and audio data;
   c) providing a second number of second frames which are defined in accordance with the particular network and each comprise non-safety-related data; and
   d) transmitting the provided first frames and the provided second frames via the bus in a predetermined sequence, a respective time interval between two respective first frames transmitted via the transmission line and two respective first frames transmitted via the receiving line being set as a function of a determined sampling rate of the audio data by the coupled end devices, and at least one respective second frame being transmitted via the transmission line and via the receiving line within the respective time interval.

2. The method according to claim 1, wherein the respective time interval is formed as a time slot which is equal to the reciprocal of the sampling rate of the audio data by the coupled end devices.

3. The method according to claim 2, wherein each time slot has a first partial time slot for transmitting exactly one first frame and a second partial time slot for transmitting at least one second frame.

4. The method according to claim 1, wherein a bus control device and the network nodes are coupled in the interlinked arrangement via the bus, the network nodes being coupled to the bus control device via the transmission line of the bus and via the receiving line of the bus, the transmission line and the receiving line being looped through the respective network nodes.

5. The method according to claim 3, wherein the respective first frames are transmitted via the transmission line and the receiving line of the bus in the respective first partial time slot by a static and deterministic time slot method.

6. The method according to claim 5, wherein the end devices coupled via the network nodes are controlled by the static and deterministic time slot method in such a way that within the respective predetermined time slot of a cycle having a particular number of time slots, exactly one particular end device can receive a first frame via the transmission line and transmit exactly one first frame via the receiving line.

7. The method according to claim 1, wherein the second frames are transmitted by a best-effort method.

8. The method according to claim 5, wherein the network nodes coupled via the bus are controlled by the time slot method in such a way that within a respective predetermined time slot exactly one particular network node can receive exactly one first frame for a coupled end device and at least one second frame via the transmission line and send exactly one first frame of a coupled end device and at least one second frame via the receiving line.

9. The method according to claim 1, wherein the first frames and the second frames are formed as Ethernet frames, the particular network preferably being formed as an Ethernet network.

10. The method according to claim 1, wherein a respective first frame is formed from the following fields:
    a first field comprising an Ethernet preamble;
    a second field comprising audio data, in particular comprising audio broadcasting data;
    a third field comprising an address which specifies at least the respective end device of the respective network node;
    a fourth field comprising the safety-related data; and
    a fifth field comprising an Ethernet checksum.

11. The method according to claim 1, wherein a respective second frame is formed from the following fields:
    a first field comprising an Ethernet preamble;
    a second field comprising an address, which specifies at least one respective network node;
    a third field comprising an IP data packet; and
    a fifth field comprising an Ethernet checksum.

12. The method according to claim 10, wherein the address of the third field of the first frame is formed as an address tuple, a first element of the address tuple addressing the respective network node and a second element of the address tuple addressing the respective end device of the respective network node.

13. The method according to claim 12, wherein a cycle having a number of time slots, the bus control device in each case transmits at least one first frame to the respective end device, addressed by the second element of the address tuple of the fourth field of the first frame, via the transmission line in a respective time slot of the cycle.

14. A device for transmitting data via network nodes of a particular network, comprising:
    a) at least two network nodes having a respective number of coupled end devices;
    b) a bus which has a transmission line and a receiving line and which couples the network nodes in an interlinked arrangement;
    c) a bus control device which is coupled to the bus and is set up to transmit first frames comprising at least safety-related data and audio data and second frames comprising non-safety-related data, defined in accordance with the particular network, via the bus in a predetermined sequence, a respective time interval between two respective first frames transmitted via the transmission line and two respective first frames transmitted via the receiving line being set as a function of a determined sampling rate of the audio data by the coupled end devices, and at least one respective second frame being transmitted via the transmission line and via the receiving line within the respective time interval.

15. A device for transmitting data and energy via network nodes of a particular network, comprising:
   a) at least two network nodes having a respective number of coupled end devices;
   b) a bus which has a transmission line and a receiving line and which couples the network nodes in an interlinked arrangement;
   c) a bus control device coupled to the bus and comprising:
      a first means which is set up to control a transmission of first frames comprising safety-related data and audio data and second frames comprising non-safety-related data, defined in accordance with the particular network, via the bus in a predetermined sequence as data voltage signals, and to control a respective time interval between two respective first frames transmitted via the transmission line and two respective first frames transmitted via the receiving line as a function of a determined sampling rate of the audio data by the coupled end devices, and a transmission of at least one respective second frame via the transmission line and via the receiving line within the respective time interval, and
      second means, which is set up to load the data voltage signals at least on the transmission line or on the receiving line with supply voltage signals adapted to the power supply of at least one network node.

* * * * *